(12) United States Patent
De Landtsheere et al.

(10) Patent No.: US 11,859,695 B2
(45) Date of Patent: Jan. 2, 2024

(54) 8-SPEED GEARBOX

(71) Applicant: TRANSMISIONES Y EQUIPOS MECANICOS, S.A. DE CV, Zedelgem (BE)

(72) Inventors: Jannick De Landtsheere, Sint-Kruis (BE); Johan Gerard Michel Joseph Vancoillie, Roeselare (BE); Maarten Debrouwere, Zedelgem (BE); Didier Genouw, Eernegem (BE)

(73) Assignee: TRANSMISIONES Y EQUIPOS MECANICOS, S.A. DE CV

( * ) Notice: Subject to any disclaimer, the term of this patent is extended or adjusted under 35 U.S.C. 154(b) by 113 days.

(21) Appl. No.: 17/611,008

(22) PCT Filed: May 13, 2020

(86) PCT No.: PCT/EP2020/063304
§ 371 (c)(1),
(2) Date: Nov. 12, 2021

(87) PCT Pub. No.: WO2020/229528
PCT Pub. Date: Nov. 19, 2020

(65) Prior Publication Data
US 2022/0228648 A1   Jul. 21, 2022

(30) Foreign Application Priority Data
May 14, 2019   (EP) ..................................... 19174430

(51) Int. Cl.
*F16H 3/00*   (2006.01)
*F16H 3/091*   (2006.01)
(Continued)

(52) U.S. Cl.
CPC ......... *F16H 3/091* (2013.01); *F16H 37/0806* (2013.01); *F16H 2003/0822* (2013.01); *F16H 2200/006* (2013.01); *F16H 2200/0082* (2013.01)

(58) Field of Classification Search
CPC ...... F16H 3/006; F16H 3/091; F16H 37/0806; F16H 2003/006; F16H 2200/0082
(Continued)

(56) References Cited

U.S. PATENT DOCUMENTS

| 4,030,575 A | 6/1977 | Moring .................. B60T 1/062 |
| 4,677,868 A | 7/1987 | Filkins ........................... 74/359 |

(Continued)

FOREIGN PATENT DOCUMENTS

| DE | 102005045158 | 3/2007 | ............. F16D 21/02 |
| DE | 102009059928 | 7/2010 | ............. F16D 13/72 |

(Continued)

OTHER PUBLICATIONS

International Search Report and Written Opinion issued in PCT/EP2020/063304, dated Jun. 17, 2020, 10 pages.
(Continued)

*Primary Examiner* — Ha Dinh Ho
(74) *Attorney, Agent, or Firm* — HAYES SOLOWAY P.C.

(57) ABSTRACT

Disclosed is an 8-speed gearbox for a dual clutch transmission, with a particular gear arrangement of the gears on the countershaft, wherein the speed or reverse gear of a gear pair that is a permanently rotationally and axially fixed gear is the radially smaller of the gear pair. One or two cluster gears may be provided, each cluster gear having two gears axially paired attached to the countershaft by a shrink fit connection.

13 Claims, 3 Drawing Sheets

(51) Int. Cl.
*F16H 37/08* (2006.01)
*F16H 3/08* (2006.01)

(58) Field of Classification Search
USPC .............................................. 74/330, 665 L
See application file for complete search history.

(56) References Cited

U.S. PATENT DOCUMENTS

| | | | | |
|---|---|---|---|---|
| 6,883,394 | B2* | 4/2005 | Koenig | F16H 61/688 |
| | | | | 74/330 |
| 7,243,565 | B2* | 7/2007 | Soeda | F16H 3/006 |
| | | | | 74/330 |
| 7,757,577 | B2* | 7/2010 | Kawamoto | F16H 61/28 |
| | | | | 477/906 |
| 8,479,906 | B2 | 7/2013 | Hauck | F16D 25/0638 |
| 8,672,109 | B2 | 3/2014 | Quartier et al. | F16D 21/06 |
| 2004/0093972 | A1* | 5/2004 | Gumpoltsberger | F16H 3/006 |
| | | | | 74/325 |
| 2005/0067251 | A1 | 3/2005 | Braford | F16D 25/13 |
| 2005/0103140 | A1* | 5/2005 | Gumpoltsberger | F16H 3/089 |
| | | | | 74/329 |
| 2006/0032722 | A1 | 2/2006 | Guinter | F16D 25/0638 |
| 2008/0134817 | A1* | 6/2008 | Bjorck | F16H 3/006 |
| | | | | 74/330 |
| 2008/0178696 | A1 | 7/2008 | Diemer et al. | 74/339 |
| 2008/0296119 | A1 | 12/2008 | Uchiyama | F16D 13/56 |
| 2009/0000896 | A1 | 1/2009 | Knowles | F16D 25/0638 |
| 2012/0085615 | A1 | 4/2012 | Noehl | F16D 25/0638 |
| 2013/0291670 | A1 | 11/2013 | Baldwin | 74/329 |
| 2018/0313411 | A1 | 11/2018 | Satoyoshi | F16H 57/023 |

FOREIGN PATENT DOCUMENTS

| | | | |
|---|---|---|---|
| EP | 1226992 | 7/2002 | ............. B60K 17/02 |
| EP | 2 107 270 | 10/2009 | ............. F16H 3/089 |
| KR | 20160016659 | 2/2016 | ............. F16D 25/123 |
| WO | WO 2018/104396 | 6/2018 | ............. F16D 21/06 |

OTHER PUBLICATIONS

International Preliminary Report on Patentability issued in PCT/EP2020/063304, dated Nov. 16, 2021, 8 pages.
International Search Report and Written Opinion issued in PCCT/EP2020/063309, dated Jul. 13, 2020, 10 pages.
International Preliminary Report on Patentability issued in PCT/EP2020/063309, dated Nov. 16, 2021, 7 pages.
International Search Report and Written Opinion issued in PCT/EP2020/063315, dated Jul. 13, 2020, 10 pages.
International Preliminary Report on Patentability issued in PCT/EP2020/063315, dated Nov. 16, 2021, 7 pages.
Notice of Allowance issued in U.S. Appl. No. 17/611,107, dated Mar. 17, 2023, 8 pages.
Notice of Allowance issued in U.S. Appl. No. 17/611,011, dated Mar. 9, 2023, 8 pages.

* cited by examiner

8-SPEED GEARBOX

FIELD OF THE INVENTION

The invention relates to an 8-speed gearbox for automotive applications, particular an 8-speed gearbox fora dual clutch transmission.

BACKGROUND OF THE INVENTION

Due to the constant demand in the automotive industry for improved efficiently and improved performance, gear boxes are required which cover a large ratio spread and/or a high gear-spread. This may answer the demand of achieving a lower vehicle fuel consumption and/or lower $CO_2$ emission. There is a demand for gear boxes with a ratio spread of more than 8. However, there is a demand for these gearboxes to be compact, especially in the axial direction. There is demand for gearboxes, wherein the space restrictions only allow for a 2-shaft designs, and where also the axial length is limited.

There is also a demand for such gearboxes to have a high torque capacity, which limits the minimum diameter of the shafts. Yet, there is a demand for light-weight designs. There is a demand for economically designed LSDs.

There is a demand for serviceable gear boxes, thereby restricting the amount of welded parts. It is accordingly one of the objects of the present invention to overcome or ameliorate one or more of the aforementioned disadvantages present in the market, or to meet any of the demands that are present in the market.

There is a demand for gearboxes that reduces the number of mechanical steps called for a gear change, in particular when reverse and $1^{st}$ gears are selected during manoeuvres. Speed of shifting during parking is advantageous, for instance, on inclines or next to a lane of fast moving traffic. Moreover, there is a reduction in mechanical wear.

EP 2 107 270 disclose an 8 speed gearbox having reverse and $1^{st}$ gear on the same shaft input drive shaft. Similarly, US 2008/0178696 270 discloses a 7 speed gearbox having reverse and $1^{st}$ gear on the same shaft input drive shaft.

SUMMARY OF THE INVENTION

The present inventors have now found that one or more of these objects can be obtained by a specific gear layout and/or the method of fixing gear to one of the shafts. In a first aspect, the invention provides a gearbox (100) for use in a vehicular transmission, comprising:
- an inner input drive shaft (10) and an outer input drive shaft (40) both transmitting torque from a dual-clutch (250) (to the gearbox),
- a counter-shaft (70) for output of torque and adapted for operable connection to wheels (308, 310) of the vehicle (via one or more gears and a differential (300)),
wherein
the outer input drive shaft (40) supports gears (42, 44, 46, 48, 49) for 4 forward even-number gear speeds and 1 reverse gear direction, and the inner input drive shaft (10) supports gears (11, 13, 15, 17) for 4 forward odd-number gear speeds, each gear meshed with a corresponding gear pair (79, 72, 74, 76, 78, 79, 71, 73, 75, 77) on the counter-shaft (70),
a gear speed is selected by an axial movement of an axially adjacent synchroniser sleeve of a corresponding synchroniser (22, 52, 54, 92, 94), said synchroniser sleeve being rotationally fixed and axially slidable relative to one of the shafts (10, 40, 70) and the selected gear (15, 17, 44, 46, 48, 71, 72, 73, 79) being revolutely attached to the same shaft (10, 40, 70), wherein the axial movement of the adjacent synchroniser sleeve engages the selected gear (15, 17, 44, 46, 48, 71, 72, 73, 79) and rotationally fixes it with respect to the same shaft (10, 40, 70) as the synchroniser (22, 52, 54, 92, 94), the selected gear being meshed with a gear pair (75, 77, 74, 76, 78, 11, 42, 13, 49) permanently rotationally and permanently axially fixed to the other shaft; and,
the permanently rotationally and permanently axially fixed gear (75, 77, 74, 76, 78, 11, 42, 13, 49) is the radially smaller of the gear pair.

The reverse gear (49) is meshed via an idler gear (59) with the corresponding gear pair (79) on the counter-shaft (70). The selected reverse gear (79) is meshed via the idler gear (59) with the gear pair (75, 77, 74, 76, 78, 11, 42, 13, 49) permanently rotationally and permanently axially fixed to the other shaft.

One gear of the gear pair corresponding to gear speeds $4^{th}$ (74) $6^{th}$ (76), $5^{th}$ (75) $7^{th}$ (77), and $8^{th}$ (79) may each be permanently rotationally and permanently axially fixed to the counter-shaft (70).

One gear of the gear pair corresponding to gear speeds 4th (74), $6^{th}$ (76), $5^{th}$ (75), $7^{th}$ (77), and $8^{th}$ (79) may be each permanently rotationally and permanently axially fixed to the counter-shaft (70), and
 one gear of the gear pair corresponding to gear speeds $4^{th}$ (74) and $6^{th}$ (76) may be each combined as a cluster gear rotationally fixed by shrink fit to the counter-shaft (70); and/or,
 one gear of the gear pair corresponding to gear speeds $5^{th}$ (75) and $7^{th}$ (77) may be each combined as a cluster gear rotationally fixed by shrink fit to the counter-shaft (70).

One gear of the gear pair corresponding to gear speeds $1^{st}$ (71) and $3^{rd}$ (73) may each be attached in revolute relation to the counter-shaft (70), each gear configured to engage alternately with the same synchroniser sleeve rotationally fixed to the counter-shaft (70) by sliding the synchroniser sleeve axially, and both gears flank the synchroniser (92); and, the other gear of the gear pair corresponding to gear speeds $1^{st}$ (11) and $3^{rd}$ (13) may each be permanently rotationally and permanently axially fixed to the inner input drive shaft (10).

One gear of the gear pair corresponding to gear speeds $5^{th}$ (15) and $7^{th}$ (17) may each be attached in revolute relation to the inner input drive shaft (10), each gear configured to engage alternately with the same synchroniser sleeve rotationally fixed to the inner input drive shaft (10) by sliding the synchroniser sleeve axially, and both gears flank the synchroniser (22); and, the other gear of the gear pair corresponding to gear speeds $5^{th}$ (75) and $7^{th}$ (77) may each be permanently rotationally and permanently axially fixed to the counter-shaft (70).

One gear of the gear pair corresponding to gear direction reverse (79) and to gear speed $2^{nd}$ (17) may each be attached in revolute relation to the counter-shaft (70), each gear configures to engage alternately with the same synchroniser sleeve rotationally fixed to the counter-shaft (70) by sliding the synchroniser sleeve axially, and both gears flank the synchroniser (94); and,
the other gear of the gear pair corresponding to gear direction reverse (49) and to gear speed $2^{nd}$ (42) may each be permanently rotationally and permanently axially fixed to the outer input drive shaft (40).

One gear of the gear pair corresponding to gear speeds $4^{th}$ (44) and $6^{th}$ (46) may each be attached in revolute relation to the outer input drive shaft (40), each gear configured to engage alternately with the same synchroniser sleeve rotationally fixed to the outer input drive shaft (40) by sliding the synchroniser sleeve axially, and both gears flank the synchroniser (54); and, the other gear of the gear pair corresponding to gear speeds $4^{th}$ (74) and $6^{th}$ (76) may each be permanently rotationally and permanently axially fixed to the counter-shaft (70).

One gear of the gear pair corresponding to gear speed $8^{th}$ (48) may be attached in revolute relation to the outer input drive shaft (40), said gear configured to engage with the corresponding synchroniser (52) sleeve rotationally fixed to the outer input drive shaft (40) by sliding the synchroniser sleeve axially; and, the other gear of the gear pair corresponding to gear speed $8^{th}$ (78) may be rotationally and permanently axially fixed to the counter-shaft (70).

The outer input drive shaft (40) may be supported by a housing on two separate bearings (56, 58) that flank the collection of gears (42, 44, 46, 48, 49) thereon, and the inner input drive shaft may be supported by a housing on two separate bearings (24, 26) that flank the collection of gears (11, 13, 15, 17) thereon.

One gear of the gear pair corresponding to gear speeds $1^{st}$ (11) and $3^{rd}$ (13) may each be integral with the inner drive shaft (10).

One gear of the gear pair corresponding to the reverse gear (49) and the $2^{nd}$ gear speed (42) may each be integral with the outer drive shaft (40).

The gears on the counter-shaft (70) may be arranged in two axially-separated groups (79, 72, 74, 76, 78 and 71, 73, 75, 77) corresponding to the even and odd-numbered gear speeds, and within each group in ascending order of gear speed (from the outer ends) towards middle of the counter-shaft (70).

The counter-shaft (70) may comprise an output gear (80) rotationally fixed (by a spline or integral with the counter-shaft) disposed towards the middle of the counter-shaft.

One gear of the gear pair corresponding to gear speeds $4^{th}$ (74) and $6^{th}$ (76) may each be combined as a cluster gear rotationally fixed by shrink fit to the counter-shaft (70); and/or, one gear of the gear pair corresponding to gear speeds $5^{th}$ (75) and $7^{th}$ (77) may each be combined as a cluster gear rotationally fixed by shrink fit to the counter-shaft (70).

One gear of the gear pair corresponding to the $8^{th}$ gear (78) may be integral with the counter-shaft (70).

The counter-shaft (70) may be supported by a housing on three separate bearings (86, 88, 90), two (86, 90) that flank the collection of gears thereon, and one (88) disposed towards the middle of the counter-shaft (between the collection of odd and even-numbered gears).

In a second aspect, the invention provides a transaxle transmission comprising the gearbox (100) described herein.

Preferred embodiments of the invention are disclosed in the detailed description and appended claims. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous. (Preferred) embodiments of one aspect of the invention are also (preferred) embodiments of all other aspects of the invention.

DETAILED DESCRIPTION OF THE INVENTION

When describing the invention, the terms used are to be construed in accordance with the following definitions, unless a context dictates otherwise.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art.

As used in the specification and the appended claims, the singular forms "a", "an," and "the" include plural referents unless the context clearly dictates otherwise. By way of example, "a gear" means one gear or more than one gear.

Unless defined otherwise, all technical and scientific terms used herein have the same meaning as is commonly understood by one of skill in the art. All publications referenced herein are incorporated by reference thereto.

Throughout this application, the term 'about' is used to indicate that a value includes the standard deviation of error for the device or method being employed to determine the value.

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

In the present description of the invention, reference is made to the accompanying drawings that form a part hereof, and in which are shown by way of illustration only of specific embodiments in which the invention may be practiced. Parenthesized or emboldened reference numerals affixed to respective elements merely exemplify the elements by way of example, with which it is not intended to limit the respective elements. It is to be understood that other embodiments may be utilised and structural or logical changes may be made without departing from the scope of the present invention. The following detailed description, therefore, is not to be taken in a limiting sense, and the scope of the present invention is defined by the appended claims.

As used herein, the term "integral gear" is a gear which is monolithic with the axle or shaft. The integral gear and the shaft or axle may be tooled from the same single object.

As used herein, the term "cluster gears" refers to at least two gears which are rigidly connected to each other, preferably the two gears are monolithic. The at least two gears may be tooled from the same single object. In some embodiments, the two gears forming a cluster gear may be spaced apart from each other by a connecting section.

The term "rotationally fixed" refers to an attachment in which rotation between the parts is locked. The term "permanently rotationally fixed" refers to an attachment in which rotation between the parts is locked at least for a duration of the lifetime of the gearbox but may optionally be detached for the purpose of repair and/or servicing.

The term "axially fixed" refers to an attachment in which an axial position of a part is locked with respect to a shaft (e.g. a gear on a shaft). The term "permanently axially fixed" refers to an attachment in which an axial position of a part is locked with respect to a shaft at least for a duration of the lifetime of the gearbox but may optionally be detached for the purpose of repair and/or servicing. The term "revolutely attached" refers to an attachment in which rotation between the parts is not locked (e.g. free-spinning gear on a shaft).

Described here is a gearbox (100) for use in a vehicular transmission (see e.g. FIGS. 1 to 3), comprising:
an inner input drive shaft (10) and an outer input drive shaft (40) both transmitting torque from a dual-clutch (250) (to the gearbox),
a counter-shaft (70) for output of torque and adapted for operable connection to wheels (308, 310) of the vehicle (via one or more gears and a differential (300)),
wherein
the outer input drive shaft (40) supports gears (42, 44, 46, 48, 49) for 4 forward even-number gear speeds and 1 reverse gear direction, and the inner input drive shaft supports gears (11, 13, 15, 17) for 4 forward odd-number gear speeds, each gear meshed with a corresponding gear pair (79, 72, 74, 76, 78, 79, 71, 73, 75, 77) on the counter-shaft (70),
wherein
a gear speed is selected by an axial movement of an axially adjacent synchroniser sleeve of a corresponding synchroniser (22, 52, 54, 92, 94), said synchroniser sleeve being rotationally fixed and axially slidable relative to one of the shafts (10, 40, 70) and the selected gear (15, 17, 44, 46, 48, 71, 72, 73, 79) being revolutely attached to the same shaft (10, 40, 70), wherein the axial movement of the adjacent synchroniser sleeve engages the selected gear (15, 17, 44, 46, 48, 71, 72, 73, 79) and rotationally fixes it with respect to the same shaft (10, 40, 70) as the synchroniser (22, 52, 54, 92, 94), the selected gear being meshed with a gear pair (75, 77, 74, 76, 78, 11, 42, 13, 49) permanently rotationally fixed to the other shaft.

The forward gear pairs may each be directly meshed. The reverse gear pair (49, 79) are not directly meshed; in order to reverse direction of rotation, an intervening idler gear (59) engages with both reverse gear pairs (49, 79).

Typically, the gears (15, 17, 44, 46, 48, 71, 72, 73, 79) that are revolutely attached to their shaft (10, 40, 70) are free-spinning and have a fixed axial (non-slidable) position on the shaft. The adjacent synchroniser engages the selected gear so rotation of the shaft and free-spinning gear become locked or synchronised.

A synchroniser (22, 52, 54, 92, 94) refers to any assembly that reproducibly brings a gear wheel normally revolutely attached to a shaft, into locked rotation with the shaft. A synchroniser typically comprises a hub permanently rotationally fixed and permanently axially fixed to the shaft. The synchroniser typically further comprises a sleeve, rotationally fixed to the hub that is slidable relative to the hub. The movement of the sleeve towards the free-spinning gear engages the sleeve with locking toothing on the free-spinning gear, so that the rotation of the shaft and free-spinning gear become locked or synchronised. The locking toothing on the gear is separate from the gear teeth that mesh with the other gear of the gear pair. A synchroniser may contain other elements such as a friction cone on the selected gear, synchroniser ring having a conical surface that engages with the friction cone on the selected gear. Other variations of a synchroniser exist as is understood in the art.

More particularly, the invention relates to a gearbox (100) for use in a vehicular transmission, comprising:
an inner input drive shaft (10) and an outer input drive shaft (40) both transmitting torque from a dual-clutch (250) (to the gearbox),
a counter-shaft (70) for output of torque and adapted for operable connection to wheels (308, 310) of the vehicle (via one or more gears and a differential (300)),
wherein
the outer input drive shaft (40) supports gears (42, 44, 46, 48, 49) for 4 forward even-number gear speeds and 1 reverse gear direction, and the inner input drive shaft supports gears (11, 13, 15, 17) for 4 forward odd-number gear speeds, each forward gear meshed with a corresponding gear pair (72, 74, 76, 78, 79, 71, 73, 75, 77) on the counter-shaft (70), the reverse gear (49) meshed via an idler gear (59) with the corresponding gear pair (79) on the counter-shaft (70),
a gear speed is selected by an axial movement of an axially adjacent synchroniser sleeve of a corresponding synchroniser (22, 52, 54, 92, 94), said synchroniser sleeve being rotationally fixed and axially slidable relative to one of the shafts (10, 40, 70) and the selected gear (15, 17, 44, 46, 48, 71, 72, 73, 79) being revolutely attached to the same shaft (10, 40, 70), wherein the axial movement of the adjacent synchroniser sleeve engages the selected gear (15, 17, 44, 46, 48, 71, 72, 73, 79) and rotationally fixes it with respect to the same shaft (10, 40, 70) as the synchroniser (22, 52, 54, 92, 94), the selected forward gear or selected reverse gear (79) via the idler gear (59) being meshed with a gear pair (75, 77, 74, 76, 78, 11, 42, 13, 49) permanently rotationally fixed to the other shaft;
and,
the permanently rotationally fixed gear (75, 77, 74, 76, 78, 11, 42, 13, 49) is the smaller of the gear pair. The smaller gear preferably referring to the radially smaller gear. This may allow providing at least one or more of the small gears as integral gear on a shaft without having to have a too large diameter on the shaft shape.

The larger gear (79, 72, 44, 46, 48, 17, 15, 73, 71) of the gear pair, is revolutely attached (freely spinning) to the same shaft as the synchroniser (94, 54, 22, 92); the synchroniser sleeve thus engages with the larger gear (79, 72, 44, 46, 48, 17, 15, 73, 71) of the gear pair. Due to the larger diameter, the larger gear may be axially thinned under the gear teeth creating axial space, into which at least part of the synchroniser can reside, preferably the synchroniser ring can be fitted. Hence, the total axial length of the gearbox may be reduced.

The larger gear (79, 72, 44, 46, 48, 17, 15, 73, 71) of at least one gear set may comprise at least one annular recess that axially reduces the width of the gear body (below the meshing teeth). At least a part of the adjacent synchroniser may be positioned in said annular recess. This may result in a shorter axial length of the gearbox.

The larger gear (79, 72, 44, 46, 48, 17, 15, 73, 71) of the gear pair is a revolutely loose gear wheel having a fixed axial position. Preferably, the larger gear (79, 72, 44, 46, 48, 17, 15, 73, 71) is mounted on a bearing, said bearing being mounted on a shaft (10, 40, 70), preferably the outer input shaft (40), the inner input shaft (10) and/or the counter shaft (70).

In some embodiments, the gearbox is a 2-shaft design.

As used herein the term "2-shaft design" refers to the number of shaft centerlines, i.e. input and countershaft, and not the total number of shafts. Likewise, a "3-shaft design" has 3 main shaft centerlines, i.e. input and two countershafts. The reverse idler shaft (60) is not considered a separate centerline.

In some embodiments, the gearbox is suitable to be coupled to a dual clutch.

In some embodiments, a double-sided synchroniser (94) is configured to engage alternatively with one gear of the reverse gear pair, one gear of the $2^{nd}$ gear pair, or with no gear at all, preferably by engaging with the larger gear (79, 72) of each gear pair.

In some embodiments, a double-sided synchroniser (54) is configured to engage alternatively with one gear of the $4^{th}$ gear pair, one gear of the $6^{th}$ gear pair, or with no gear at all, preferably by engaging with the larger gear (44, 46) of each gear pair.

In some embodiments, a double-sided synchroniser (52) is configured to engage alternatively with one gear of the $8^{th}$ gear pair, or with no gear at all, preferably by engaging with the larger gear (48) of the $8^{th}$ gear set.

In some embodiments, a double-sided synchroniser (22) is configured to engage alternatively with one gear of the $7^{th}$ gear pair, one gear of the $5^{th}$ gear pair, or with no gear at all, preferably by engaging with the larger gear (17, 15) of each gear set.

In some embodiments, a double-sided synchroniser (92) is configured to engage alternatively with one gear of the $3^{rd}$ gear pair, one gear of the $1^{st}$ gear pair, or with no gear at all, preferably by engaging with the larger gear (13, 11) of each gear set.

In some embodiments, one gear of the gear pair corresponding to gear speeds $4^{th}$ (74) $6^{th}$ (76), $5^{th}$ (75), $7^{th}$ (77) and $8^{th}$ (79) is each permanently rotationally and permanently axially fixed to the counter-shaft (70).

In some embodiments, one gear of the gear pair corresponding to gear speeds $1^{st}$ (71) and $3^{rd}$ (73) is each attached in revolute relation to the counter-shaft (70), each gear configured to engage alternately with the same synchroniser sleeve rotationally fixed to the counter-shaft (70) by sliding the synchroniser sleeve axially, and both gears flank the synchroniser (92); and, the other gear of the gear pair corresponding to gear speeds $1^{st}$ (11) and $3^{rd}$ (13) is each permanently rotationally and permanently axially fixed to the inner input drive shaft (10).

In some embodiments, one gear of the gear pair corresponding to gear speeds $5^{th}$ (15) and $7^{th}$ (17) is each attached in revolute relation to the inner input drive shaft (10), each gear configured to engage alternately with the same synchroniser sleeve rotationally fixed to the inner input drive shaft (10) by sliding the synchroniser sleeve axially, and both gears flank the synchroniser (22); and, the other gear of the gear pair corresponding to gear speeds $5^{th}$ (75) and $7^{th}$ (77) is each permanently rotationally and permanently axially fixed to the counter-shaft (70).

In some embodiments, one gear of the gear pair corresponding to gear direction reverse (79) and to gear speed $2^{nd}$ (72) is each attached in revolute relation to the counter-shaft (70), each gear configures to engage alternately with the same synchroniser sleeve rotationally fixed to the counter-shaft (70) by sliding the synchroniser sleeve axially, and both gears flank the synchroniser (94); and, the other gear of the gear pair corresponding to gear direction reverse (49) and to gear speed $2^{nd}$ (42) is each permanently rotationally and permanently axially fixed to the outer input drive shaft (40).

In some prior art designs, the reverse gear on an input drive shaft supports odd-numbered gears, i.e. the same shaft as the $1^{st}$ gear. In the present configuration, the reverse gear is provided on the outer input drive shaft (40) supporting even numbered gears. The configuration allows a $1^{st}$-reverse-$1^{st}$ gear shift to be purely a clutch to clutch shift since the $1^{st}$ and reverse gears remain preselected in the gear box. With the prior art design where the reverse gear on the input drive shaft support odd-numbered gears, the same sequence requires a gear to gear shift: clutch opens, gear selection changes $1^{st}$-reverse-$1^{st}$, clutch closed. A clutch to clutch shift is much faster, and also leads to less mechanical wear because the synchroniser is not called into action. Transmissions with reverse and $1^{st}$ gear on same shaft are known to suffer from delays in changing vehicle direction leading to more difficult parking manoeuvres.

In some embodiments, one gear of the gear pair corresponding to gear speeds $4^{th}$ (44) and $6^{th}$ (46) is each attached in revolute relation to the outer input drive shaft (40), each gear configured to engage alternately with the same synchroniser sleeve rotationally fixed to the outer input drive shaft (40) by sliding the synchroniser sleeve axially, and both gears flank the synchroniser (54); and, the other gear of the gear pair corresponding to gear speeds $4^{th}$ (74) and $6^{th}$ (76) is each permanently rotationally and permanently axially fixed to the counter-shaft (70).

In some embodiments, one gear of the gear pair corresponding to gear speed $8^{th}$ (48) is attached in revolute relation to the outer input drive shaft (40), said gear configured to engage with the synchroniser sleeve rotationally fixed to the outer input drive shaft (40) by sliding the synchroniser sleeve axially; and, the other gear of the gear pair corresponding to gear speed $8^{th}$ (78) is permanently rotationally fixed and permanently axially to the counter-shaft (70).

In some embodiments, the outer input drive shaft (40) is supported by a housing on two separate bearings (56, 58) that flank the collection of gears (42, 44, 46, 48, 49) thereon, and the inner input drive shaft is supported by a housing on two separate bearings (24, 26) that flank the collection of gears (11, 13, 15, 17) thereon. Preferably bearings are radial bearings. This may have the advantage that the outer input shaft does not need to be provided with a collar to fit over a bearing between the outer and inner input shaft. Hence the diameter of outer input shaft does not need to be enlarged. This may also has the advantage that the bearing may have a higher load capacity, as the load may be split over more bearings.

In some embodiments, one gear of the gear pair corresponding to gear speeds $1^{st}$ (11) and $3^{rd}$ (13) is each integral with the inner drive shaft (10).

In some embodiments, one gear of the gear pair corresponding to the reverse gear (49) and the $2^{nd}$ gear speed (42) is each integral with the outer drive shaft (40).

In some embodiments, the gears on the counter-shaft (70) are arranged in two axially-separated groups (79, 72, 74, 76, 78 and 71, 73, 75, 77) corresponding to the even and odd-numbered gear speeds, and within each group in ascending order of gear speed (from the outer ends) towards middle of the counter-shaft (70).

As the diameter of the smallest gear limits the maximum diameter of the shaft, it is advantageous to provide a shaft with the largest diameter in the middle, and then thinning the diameter towards the ends, so that gears can be slid on the shaft from both ends. Such a lay out provides for the smallest possible small gear, thereby enlarging the ratio spread.

In some embodiments, the counter-shaft (70) comprises an output gear (80) rotationally fixed disposed towards the middle of the counter-shaft. As the output gear does not mesh with a gear on one of the input shafts, axial space is available at the axial height of the output gear on the input shafts. This space may be used for bearing the inner input shaft 10 and the outer input shaft 40 by separate radial bearings, instead of one radial bearing, plus a needle bearing between the shafts. This may allow for higher capacity and does not require modification or enlargement of the diameter of the outer input shaft to accommodate for a bearing between the two input shafts.

In some embodiments, the output gear (80) is rotationally fixed by a spline connection. Especially for the high torque applications, a shrink fit with requires more axial length than the axial length of the required gear teeth, a spline connection does not require extra axial space, shortening the overall axial length of the gearbox.

In some embodiments, one gear of the gear pair corresponding to gear speeds $4^{th}$ (74) and $6^{th}$ (76) is each combined as a cluster gear rotationally fixed by shrink fit to the counter-shaft (70). The connecting section of the cluster gear provides enough surface for a robust shrink fit, strong enough so that the area underneath the smallest gear of the cluster gear does not have to participate in the shrink fit. This way, even the small gear can be fixed by a shrink fit, although their small diameter would not allow it to be shrink fitted on its own. This allows for small "small gears", allowing a large ratio spread. Especially for the high torque application, the shaft must have quite a large minimum diameter, to be able to handle such high torque. The shrink fit of the cluster gears does not require a reduction in diameter of the countershaft. Even more, such cluster gear can be placed right next to an integral gear. This has the advantage that the axial length can be optimally used, what is not possible for two integral gears, as they cannot be tooled when they are right next to each other or touching each other on a shaft.

In some embodiments, one gear of the gear pair corresponding to gear speeds $5^{th}$ (75) and $7^{th}$ (77) is each combined as a cluster gear rotationally fixed by shrink fit to the counter-shaft (70).

In some embodiment, the small gears (74 and 76; 77 and 75) of gear sets ($4^{th}$ and $6^{th}$; $7^{th}$ and $5^{th}$) which are actuated by the same synchroniser (54, 22) are combined as a cluster gear on the countershaft (70).

In some embodiments, one gear of the gear pair corresponding to the $8^{th}$ gear (78) is integral with the counter-shaft (70).

In some embodiments, the small gear (74) of the $4^{th}$ gear set and the small gear 76 of the $6^{th}$ gear set cluster gear is placed less than 10 mm, preferably less than 8 mm, more preferably less than 6 mm, even more preferably less than 4 mm, yet more preferably less than 2 mm, and most preferably less than 1 mm axial distance away from the small gear (78) of the $8^{th}$ gear set on the countershaft (70).

In some embodiments, the small gear (74) of the $4^{th}$ gear set and the small gear (76) of the $6^{th}$ gear set cluster gear is touching the small gear (78) of the $8^{th}$ gear set on the countershaft (70), preferably the small gear (76) of the $6^{th}$ gear set is touching the small gear (78) of the $8^{th}$ gear set.

In some embodiments, the counter-shaft (70) is supported by a housing on three separate bearings (86, 88, 90), two (86, 90) that flank the collection of gears thereon, and one (88) disposed towards the middle of the counter-shaft preferably between the collection of odd and even-numbered gears.

This has the advantage of improving shaft strength and reducing deformations. Preferably, said bearings are radial bearings.

In some embodiments, the gearbox comprises a pinion shaft (84), whereon a pinion (83) is rotationally fixed for meshing with the ring gear (302) on a differential (300) and whereon a gear (82) is rotationally fixed for meshing with the output gear (80).

In some embodiments, the gearbox comprises an idler gear (59), mounted on an idler shaft (60), for meshing with both the larger gear (79) of the reverse gear set and the smaller gear (49) of the reverse gear set.

In another aspect, the invention provides in a transaxle transmission comprising the gearbox according to an embodiment of the invention.

The invention will be more readily understood by reference to the following examples, which are included merely for purpose of illustration of certain aspects and embodiments of the present invention and are not intended to limit the invention.

EXAMPLES

Figure 1:
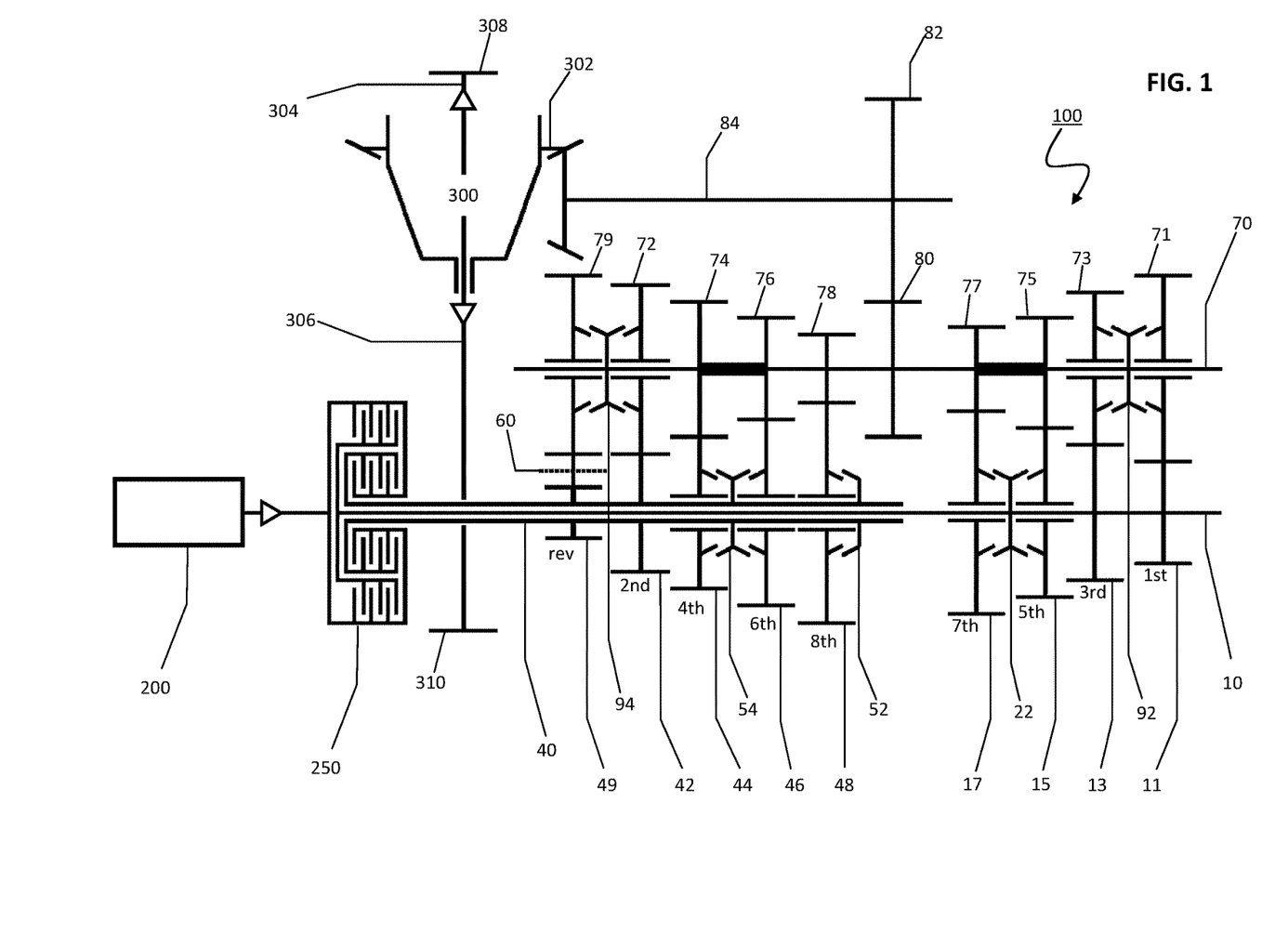
FIG. 1 provides a schematic overview of the layout of a gearbox according to an embodiment of the invention and shows its relation to other components of the transmission and the vehicle.

FIG. 1 depicts a schematic representation of a gear box according to an embodiment of the invention.

Power is fed from the engine (200) to the dual clutch (250), the output of the dual clutch are the power input of the gear box (100), i.e. the inner input drive shaft (10) and the outer input drive shaft (40), these two input shafts (10), (40) being at least partially concentrically arranged. Parallel to these input shafts (10, 40), a single countershaft (70) is arranged; hence, the gear box (100) is as known in the art a 2-shaft design.

The countershaft supports an output gear (80), which meshes with a gear (82) on the pinion shaft (84), said pinion shaft transferring power to the differential (300), preferably a limited slip differential by meshing of the pinion (83) with the ring gear (302) of the differential, said differential splitting the torque over the two output shafts (304) and (306), respectively connected to the wheels (308 and 310).

The outer input shaft (40), provides the even gear sets, i.e. 2nd, $4^{th}$, $6^{th}$, $8^{th}$ gear sets, and the reverser gear set, and this by starting from the engine side:

the smallest gear (49) of the reverse gear pair being rotationally fixed to the outer input shaft (40), by being an integral gear;

the smallest gear (42) of the $2^{nd}$ gear pair being rotationally fixed to the outer input shaft (40); by being an integral gear;

the largest gear (44) of the 4$^{th}$ gear set being rotationally supported by the outer input shaft (40) via a bearing;

the 4$^{th}$/6$^{th}$ gear synchroniser (54 being rotationally fixed to the outer input shaft (40), via a spline connection;

the largest gear (46) of the 6$^{th}$ gear set being rotationally supported by the outer input shaft (40) via a bearing;

the largest gear (48) of the 8$^{th}$ gear set being rotationally supported by the outer input shaft (40) via a bearing;

the 8$^{th}$ gear synchroniser (52) being rotationally fixed to the outer input shaft (40);

Wherein the 4$^{th}$/6$^{th}$ gear synchroniser is a double sided synchroniser, configured to either engage with the 4$^{th}$ gear, the 6$^{th}$ gear or no gear at all. The 8$^{th}$ gear synchroniser (52) is a single sided synchroniser configured to either engage with the 8$^{th}$ gear or no gear at all.

Figure 2:
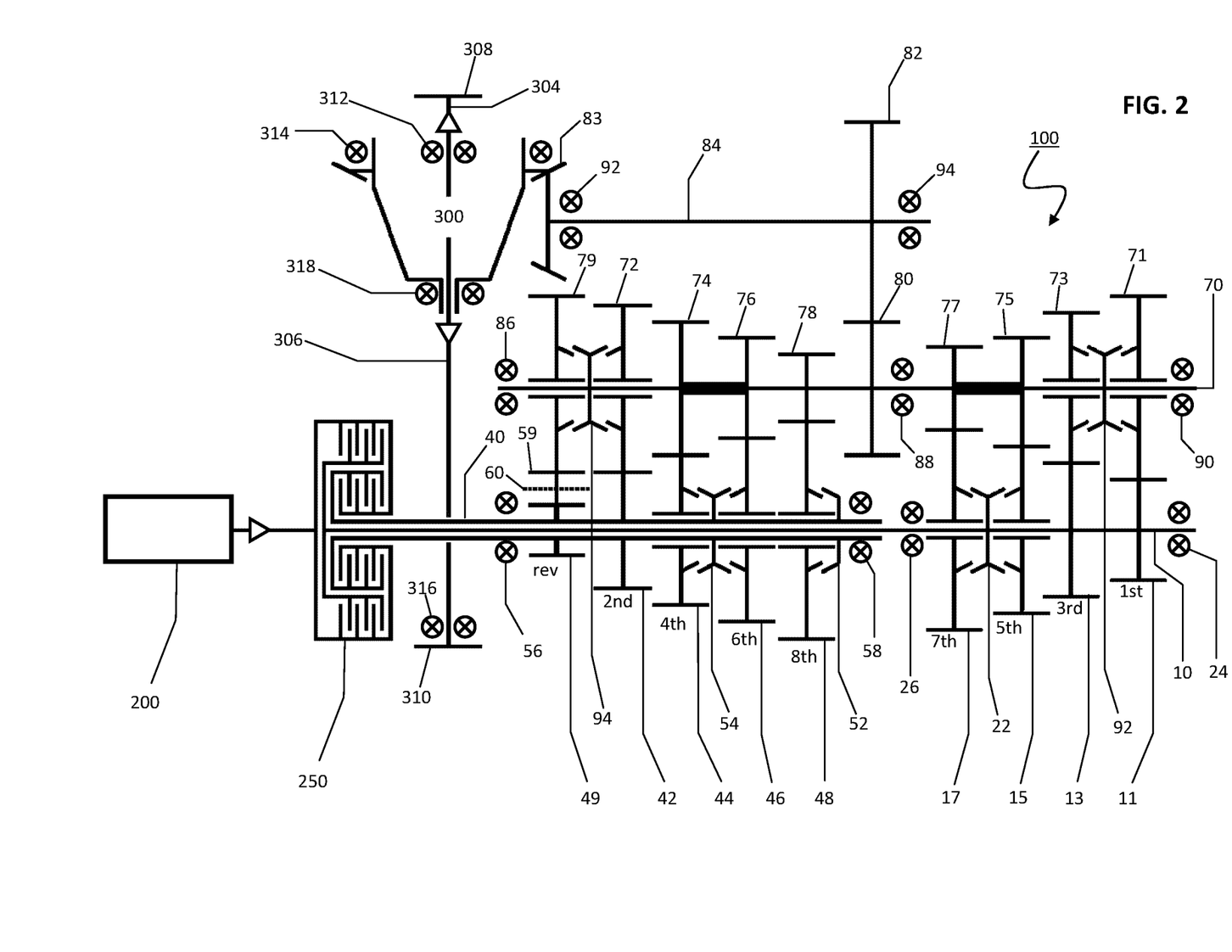
FIG. 2 provides the same schematic overview as in FIG. 1, with the addition of bearings.

FIG. 2 shows the bearings used to support the different shafts in the housing. The outer input shaft (40) is borne by two bearings (56 and 58). The inner input shaft (10) is borne by two bearings (26 and 24). The countershaft is borne by three bearings one at each end (86 and 90), and a bearing (88) between the output gear (80) and the smallest gear (77) of the 7$^{th}$ gear set.

The pinion shaft (84) is borne by bearings (92 and 94). The differential (300) is borne by bearings (314 and 318). Wheel bearings (312 and 316) bear the output shafts (304 and 306).

Figure 3:
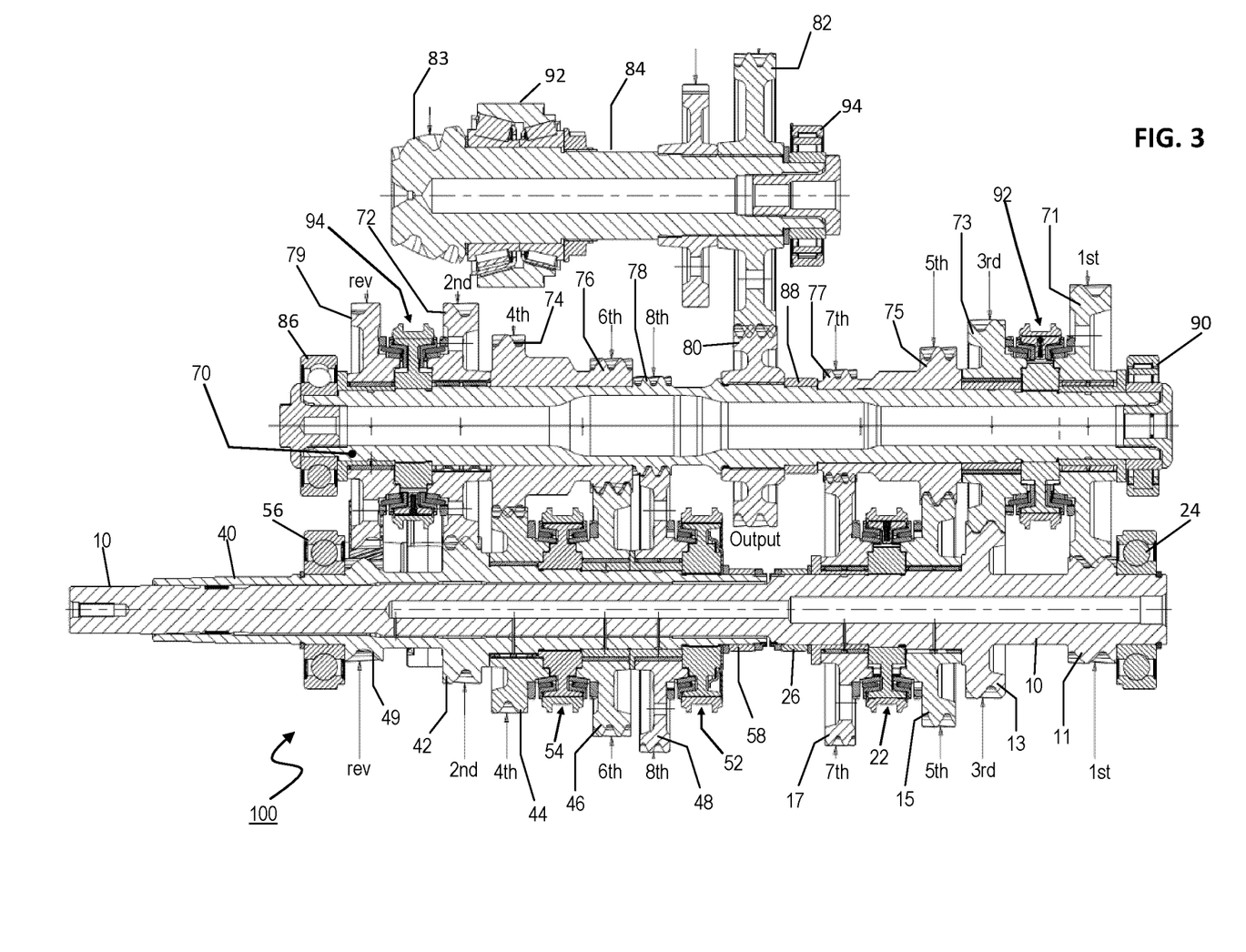
FIG. 3 is a cross-section of a gearbox according to an embodiment of the invention.

FIG. 3 shows a cross-section view of an exemplary gearbox described herein. FIG. 3 shows that the largest gear (46) of the 6$^{th}$ gear pair comprises an annular recess at the engine side, wherein at least part of the synchroniser ring of the 6$^{th}$ gear is placed in, said recess thereby reducing the axial length of the gear box.

FIG. 3 further shows that the largest gear (48) of the 8$^{th}$ gear pair comprises an annular recess at the opposing engine side, wherein at least part of the synchroniser ring of the 8$^{th}$ gear is placed in, said recess thereby reducing the axial length of the gear box.

The inner input shaft (10), provides the odd gear sets, i.e. 1$^{th}$, 3$^{th}$, 5$^{th}$, 7$^{th}$ gear sets, and this by starting from the engine side:

the largest gear (17) of the 7$^{th}$ gear set being rotationally supported by the inner input shaft (10) via a bearing;

the 7$^{th}$/5$^{th}$ gear synchroniser (22) being rotationally fixed to the inner input shaft (10, via a spline connection;

the largest gear (15) of the 5$^{th}$ gear set being rotationally supported by the inner input shaft (10) via a bearing;

the smallest gear (13) of the 3$^{th}$ gear pair being rotationally fixed to the inner input shaft (10), by being an integral gear;

the smallest gear (11) of the 1$^{st}$ gear pair being rotationally fixed to the inner input shaft (10), by being an integral gear;

Wherein the 7$^{th}$/5$^{th}$ gear synchroniser is a double sided synchroniser, configured to either engage with the 7$^{th}$ gear, the 5$^{th}$ gear or no gear at all.

FIG. 3 further shows that the largest gear (17) of the 7$^{th}$ gear pair comprises an annular recess at the opposing engine side, wherein at least part of the synchroniser ring of the 7$^{th}$ gear is placed in, said recess thereby reducing the axial length of the gear box.

The countershaft provides starting from the engine side:

the largest gear (79) of the reverse gear set being rotationally supported by the countershaft (70) via a bearing;

the reverse/2$^{th}$ gear synchroniser (94) being rotationally fixed to the countershaft (70), via a spline connection;

the largest gear (72) of the 2$^{nd}$ gear set being rotationally supported by the countershaft (70) via a bearing;

the smallest gear (74) of the 4$^{th}$ gear pair being rotationally fixed to the counter shaft (70), via a shrink fit, thereby not requiring a reduction in diameter of the countershaft for said rotational fix;

the smallest gear (76) of the 6$^{th}$ gear pair being rotationally fixed to the counter shaft (70), via being connected to the smallest gear (74) of the 4$^{th}$ gear pair by being a cluster gear, hence this rotational fix does not require a reduction in diameter of the countershaft;

the smallest gear (78) of the 8$^{th}$ gear pair being rotationally fixed to the counter shaft (70, by being an integral gear;

the output gear (80) being rotationally fixed to the counter shaft (70), via a spline connection;

the smallest gear (77) of the 7$^{th}$ gear pair being rotationally fixed to the counter shaft (70), via being connected to the smallest gear (75 of the 5$^{th}$ gear pair by being a cluster gear, hence this rotational fix does not require a reduction in diameter of the countershaft.

the smallest gear (75) of the 5$^{th}$ gear pair being rotationally fixed to the counter shaft (70), via a shrink fit, thereby not requiring a reduction in diameter of the countershaft for said rotational fix;

the largest gear (73) of the 3$^{th}$ gear set being rotationally supported by the countershaft (70) via a bearing;

the 3$^{th}$/1$^{st}$ gear synchroniser (92) being rotationally fixed to the countershaft (70), via a spline connection;

the largest gear (71) of the 1$^{st}$ gear set being rotationally supported by the countershaft (70) via a bearing.

In FIG. 3 the largest gear (79) of the reverse gear pair comprises an annular recess at the opposing engine side, wherein at least part of the synchroniser ring of the reverse gear is placed in, said recess thereby reducing the axial length of the gear box.

In FIG. 3 the largest gear (72) of the 2$^{nd}$ gear pair comprises an annular recess at the engine side, wherein at least part of the synchroniser ring of the 2$^{nd}$ gear is placed in, said recess thereby reducing the axial length of the gear box.

In FIG. 3 the largest gear (71) of the 1$^{st}$ gear pair comprises an annular recess at the engine side, wherein at least part of the synchroniser ring of the 1$^{st}$ gear is placed in, said recess thereby reducing the axial length of the gear box.

FIG. 3 also shows bearings used to support the different shafts in the housing. The outer input shaft (40) is borne by two bearings (56 and 58) (only part of the bearing 58 is drawn). The inner input shaft (10) is borne by two bearings (26 and 24) (only part of the bearing 26 is drawn). The countershaft is borne by three bearings one at each end (86 and 90), and a bearing (88) (only part of the bearing 88 is drawn) between the output gear (80) and the smallest gear (77) of the 7$^{th}$ gear set. The pinion shaft (84) is borne by bearings (92 and 94).

It is to be understood that although preferred embodiments and/or materials have been discussed for providing embodiments according to the present invention, various modifications or changes may be made without departing from the scope and spirit of this invention.

The invention claimed is:

1. A gearbox for use in a vehicular transmission, comprising:

an inner input drive shaft and an outer input drive shaft both transmitting torque from a dual-clutch to the gearbox, a counter-shaft for output of torque and configured for operable connection to wheels of the vehicle via one or more gears and a differential, wherein the outer input drive shaft supports gears for 4 forward even-number gear speeds and 1 reverse gear direction, and the inner input drive shaft supports gears for 4 forward odd-number gear speeds, each gear meshed with a corresponding gear pair on the counter-shaft, the reverse gear meshed via an idler gear with the corresponding gear pair on the counter-shaft, a gear speed is selected by an axial movement of an axially adjacent synchroniser sleeve of a corresponding synchroniser, said synchroniser sleeve being rotationally fixed and axially slidable relative to one of the shafts and the selected gear being revolutely attached to the same shaft, wherein the axial movement of the adjacent synchroniser sleeve engages the selected gear and rotationally fixes the selected gear with respect to the same shaft as the synchroniser, the selected forward gear or selected reverse gear via the idler gear being meshed with a gear pair permanently rotationally and permanently axially fixed to the other shaft; and, the permanently rotationally and permanently axially fixed gear is the radially smaller of the gear pair, and wherein one gear of the gear pair corresponding to ear speeds $4^{th}$, $6^{th}$, $5^{th}$, $7^{th}$, and $8^{th}$ is each permanently rotationally and permanently axially fixed to the counter-shaft, and one ear of the gear pair corresponding to gear speeds $4^{th}$ and $6^{th}$ is each combined as a cluster gear that has a shrink fit connection to the counter-shaft to rotationally fix the cluster to the counter-shaft; and/or, one gear of the gear pair corresponding to gear speeds $5^{th}$ and $7^{th}$ is each combined as a cluster gear that has a shrink fit connection to the counter-shaft shaft to rotationally fix the cluster to the counter-shaft.

2. The gear box according to claim 1, wherein one gear of the gear pair corresponding to gear speeds $1^{st}$ and $3^{rd}$ is each attached in revolute relation to the counter-shaft, each gear configured to engage alternately with the same synchroniser sleeve rotationally fixed to the counter-shaft by sliding the synchroniser sleeve axially, and both gears flank the synchroniser; and, the other gear of the gear pair corresponding to gear speeds $1^{st}$ and $3^{rd}$ is each permanently rotationally and permanently axially fixed to the inner input drive shaft.

3. The gear box according to claim 1, wherein one gear of the gear pair corresponding to gear speeds $5^{th}$ and $7^{th}$ is each attached in revolute relation to the inner input drive shaft, each gear configured to engage alternately with the same synchroniser sleeve rotationally fixed to the inner input drive shaft by sliding the synchroniser sleeve axially, and both gears flank the synchroniser; and, the other gear of the gear pair corresponding to gear speeds $5^{th}$ and $7^{th}$ is each permanently rotationally and permanently axially fixed to the counter-shaft.

4. The gear box according to claim 1, wherein one gear of the gear pair corresponding to gear direction reverse and to gear speed $2^{nd}$ is each attached in revolute relation to the counter-shaft, each gear configures to engage alternately with the same synchroniser sleeve rotationally fixed to the counter-shaft by sliding the synchroniser sleeve axially, and both gears flank the synchroniser; and, the other gear of the gear pair corresponding to gear direction reverse and to gear speed $2^{nd}$ is each permanently rotationally and permanently axially fixed to the outer input drive shaft.

5. The gear box according to claim 1, wherein one gear of the gear pair corresponding to gear speeds $4^{th}$ and $6^{th}$ is each attached in revolute relation to the outer input drive shaft, each gear configured to engage alternately with the same synchroniser sleeve rotationally fixed to the outer input drive shaft by sliding the synchroniser sleeve axially, and both gears flank the synchroniser; and, the other gear of the gear pair corresponding to gear speeds $4^{th}$ and $6^{th}$ is each permanently rotationally and permanently axially fixed to the counter-shaft.

6. The gear box according to claim 1, wherein one gear of the gear pair corresponding to gear speed $8^{th}$ is attached in revolute relation to the outer input drive shaft, said gear configured to engage with the corresponding synchroniser sleeve rotationally fixed to the outer input drive shaft by sliding the synchroniser sleeve axially; and, the other gear of the gear pair corresponding to gear speed $8^{th}$ is permanently rotationally and permanently axially fixed to the counter-shaft.

7. The gear box according to claim 1, wherein the outer input drive shaft is supported by a housing on two separate bearings that flank a collection of gears thereon for the 4 forward even-numbered gear speeds and the 1 reverse gear direction, and the inner input drive shaft is supported by the housing on two separate bearings that flank a collection of gears thereon for the 4 forward odd-numbered gear speeds.

8. The gear box according to claim 1, wherein one gear of the gear pair corresponding to gear speeds $1^{st}$ and $3^{rd}$ is each integral with the inner drive shaft, and/or one gear of the gear pair corresponding to the reverse gear and the $2^{nd}$ gear speed is each integral with the outer drive shaft.

9. The gear box according to claim 1, wherein the gears on the counter-shaft are arranged in two axially-separated groups corresponding to the even and odd-numbered gear speeds, and within each group in ascending order of gear speed from the outer ends towards middle of the counter-shaft.

10. The gear box according to claim 1, wherein the counter-shaft comprises an output gear rotationally fixed to the counter-shaft and disposed towards the middle of the counter-shaft.

11. The gear box according to claim 1, wherein one gear of the gear pair corresponding to the $8^{th}$ gear is integral with the counter-shaft.

12. The gear box according to claim 1, wherein the counter-shaft is supported by a housing on three separate bearings, two that flank a collection of gears thereon for the 4 forward even-numbered gear speeds, the 4 forward odd-numbered speeds, and the 1 reverse gear direction, and one disposed towards the middle of the counter-shaft.

13. A transaxle transmission comprising the gearbox according to claim 1.

* * * * *